United States Patent
Dyvig

[11] Patent Number: 5,103,671
[45] Date of Patent: Apr. 14, 1992

[54] HYDROSTATIC TEST STAND
[75] Inventor: Daniel E. Dyvig, Kelley, Iowa
[73] Assignee: Sauer, Inc., Wilmington, Del.
[21] Appl. No.: 619,236
[22] Filed: Nov. 28, 1990
[51] Int. Cl.⁵ .......................................... G01M 19/00
[52] U.S. Cl. .................................................. 73/168
[58] Field of Search .............. 73/112, 116, 117, 117.2, 73/118.1, 168, 862.09, 862.14, 862.16

[56] References Cited

U.S. PATENT DOCUMENTS

| | | |
|---|---|---|
| 3,712,127 | 1/1973 | Petersen . |
| 4,176,549 | 12/1979 | Eichinger . |
| 4,368,638 | 1/1983 | Groves et al. . |
| 4,382,388 | 5/1983 | Ono . |
| 4,798,086 | 1/1989 | Styfhoorn ............................ 73/168 |
| 4,807,467 | 2/1989 | Kugler . |
| 4,870,819 | 10/1989 | Walzer . |

Primary Examiner—Robert Raevis
Attorney, Agent, or Firm—Zarley, McKee, Thomte, Voorhees & Sease

[57] ABSTRACT

A test stand for testing hydrostatic drive units which have a variable displacement hydraulic pump in a closed fluid circuit with a hydraulic motor and are characterized by a motor output speed and a system fluid pressure. The test stand includes a power source for energizing a hydrostatic drive unit, a speed control for controlling the level of motor output speed, a pressure control for controlling the level of system fluid pressure, sensors for detecting the instantaneous level of motor output speed and system fluid pressure, and logic circuits for providing a command signal responsive to the sensed instantaneous levels to the speed control and the pressure control.

21 Claims, 1 Drawing Sheet

HYDROSTATIC TEST STAND

BACKGROUND OF THE INVENTION

1. Technical Field

The present invention is directed toward a testing apparatus for a drive unit, and more particularly toward an electronically controlled apparatus for testing a hydrostatic drive unit. The testing apparatus is operable to test a drive unit over a range of motor speeds and system pressures to simulate in a laboratory environment the operating conditions which the drive unit would experience in the actual use.

2. Background Art

Present hydrostatic drive units include a variable displacement hydraulic pump driven by an input shaft. A hydraulic fluid is pumped from the hydraulic pump to a fixed or variable displacement hydraulic motors for driving an output shaft. In these devices, there is no mechanical linkage between the input shaft which drives the hydraulic pump and the output shaft which is driven by the hydraulic motor.

Many hydraulic pumps or motors of the variable displacement type have a rotating cylinder block with pistons axially movable therein. The displacement of the hydraulic pump is proportional to the stroke of the pistons within the cylinder block. The pistons engage a tiltable swashplate to vary the stroke of the pistons and prescribe the displacement of the pump. Operation of the drive unit, as characterized by the rotational speed of the output shaft of the motor, can thus be effected by positioning of the tiltable swashplate.

Hydrostatic drive units may be further characterized by the system fluid pressure within the two fluid lines which connect the variable displacement pump and the hydraulic motor and form a closed-loop fluid circuit. As the hydraulic pump directs fluid at a flow rate commanded by the position of the pump swashplate toward the motor, motor pistons are displaced and the output shaft is forced to rotate. Any rotational resistance encountered by the shaft results in the build up of pressure within the fluid lines connecting the pump and motor.

In order to test the operability, durability, and performance of newly designed hydraulic drive unit components, test stands are used. The test stands primarily incorporate a drive means for driving either the hydraulic pumps or motors under simulated working conditions for extended periods of time. Under these simulated conditions, the displacement of the hydraulic pumps and motors are varied throughout the safe operating range for which the components were designed.

The simplest type or prior art stands incorporate a drive means for driving either a hydraulic pump or motor and a meter for reading the variations of output from the hydraulic device. More elaborate test stands incorporate the combination of hydraulic pumps and motors together with cooling and metering systems in order to assure that optimum efficiency is obtained. It is not possible with the prior art devices, however, to automatically control the operation of the test specimen according to a predetermined profile of motor speeds and fluid system pressures. In order to modify the operation conditions, the meters must be manually read and the test stand must be appropriately adjusted. Further, it is not possible with earlier devices to run more than one type of test on a given test stand, i.e. switch from performance testing to endurance testing without moving to another test stand.

The prior art also fails to provide systems which can test a hydrostatic drive unit at a zero delta system pressure drop between the two fluid lines comprising the closed loop. This is a particularly important feature when assessing the performance characteristics of the drive unit when going from a driving or uphill load to an absorbing or downhill load.

Additionally, energization of the prime mover for driving the test specimen can be costly over extened test schedules. While some costly stands currently provide a regenerative feature wherein a major portion of the input power can be recovered and reused in testing additional hydraulic devices to minimize operating expense, none provide a power regenerative feature in which prime mover energy can be regenerated at variable hydrostatic motor speeds.

The present invention is directed toward overcoming one or more of the problems set forth above.

SUMMARY OF THE INVENTION

In one aspect of the present invention, a test stand is provided for testing hydrostatic drive units which have a variable displacement hydraulic pump in a closed fluid circuit with a hydraulic motor and are characterized by a motor output speed and a system fluid pressure. The test stand includes a power source for energizing a hydrostatic drive unit, a speed control for controlling the level of motor output speed, a pressure control for controlling the level of system fluid pressure, sensors for detecting the instantaneous level of motor output speed and system fluid pressure, and a supervisory controller for providing a command signal responsive to the sensed instantaneous levels to the speed control means and the pressure control means.

In one form of the invention, the speed control is an electronic control adapted to vary the displacement of the hydraulic pump. The load control includes electronic and hydraulic controls adapted to vary the magnitude of resistance force on the hydraulic motor.

In another form, one of the sensors is a pressure transducer positioned to sense the relative difference in system fluid pressure between each of a pair of fluid lines defining the closed fluid circuit. Another of the sensors is a speed sensor mounted adjacent an output shaft of the hydraulic motor.

Further, the test stand has a setpoint generator for generating a command signal responsive to the sensed motor output speed and system fluid pressure levels and representative of a desired motor output speed and system fluid pressure.

The present invention also comprehends a test stand having a prime mover means for energizing a hydrostatic drive unit with a speed modulator for modulating hydraulic motor output speed and a pressure modulator for modulating the system fluid pressure. Sensors monitor the motor output speed and the system fluid pressure of the hydrostatic drive unit while an electronic controller generates a command signal sufficient to maintain the motor output speed and the system fluid pressure at predetermined levels. Electronic circuitry is provided for interconnecting the components to transmit the command signal to the speed modulator means and the pressure modulator.

In one aspect of the present invention, the test stand has a hydrostatic load unit with a pair of hydraulic devices connected in a closed fluid circuit The hydrostatic load unit is interconnected with the hydrostatic drive unit for modulating the system fluid pressure in the hydrostatic drive unit.

In another aspect of the present invention, one of the hydraulic devices in the hydrostatic load unit is a hydraulic motor and has a first motor output shaft and the hydraulic motor of the hydrostatic drive unit has a second motor output shaft. The first motor output shaft and the second motor output shaft are fixedly interconnected. The other of the hydraulic devices in the hydrostatic load unit is a variable displacement hydraulic pump and has a first pump shaft and the variable displacement hydraulic pump of the hydrostatic drive unit has a second pump shaft. The first pump shaft and the second pump shaft are drivingly connected with the prime mover.

In one form, gear reduction means are positioned between the prime mover and the second pump shaft for varying the degree of energization of the hydrostatic drive unit. The gear reduction means may be in the form of an additional hydrostatic drive unit.

In another form, the test stand according has an electronic controller for varying the displacement of the variable displacement hydraulic pump in the hydrostatic load unit in response to the relative pressure difference between the two lines of the closed loop circuit as well as the motor output speed.

The present still further comprehends a test stand for testing hydrostatic drive units having a variable displacement hydraulic pump in a closed fluid circuit with a hydraulic motor at a predetermined operating profile of motor output speed and system fluid pressure. The test stand includes in addition to the above embodiments a setpoint generating means for generating a command signal responsive to sensed motor output speed and system fluid pressure and representative of a desired motor output speed and system fluid pressure. Electronic circuitry interconnects a speed modulator and a pressure modulator with a number of sensors and the setpoint generator.

In one form, the setpoint generator is in the form of a data acquisition apparatus for recording the motor output speed levels and system fluid pressure levels detected by sensors in an operating profile. The setpoint generator also includes a command device for generating a command signal responsive to the sensed motor output speed and system fluid pressure and representative of a desired motor output speed and system fluid pressure as determined by corresponding levels in the recorded operating profile. The setpoint generator could be a personal computer.

In yet another form, the test stand has regeneration structure for transmitting energy absorbed by the hydraulic load unit during operation of the hydraulic drive unit back to the prime mover such that energy consumption of the primer mover is reduced.

Other objects, features and advantages of the invention will be apparent from the following detailed description taken in connection with the accompanying drawings.

BRIEF DESCRIPTION OF THE DRAWINGS

The features of this invention which are believed to be novel are set forth with particularity in the appended claims. The invention, together with its objects and the following description taken in conjunction with the accompanying drawings, in which like reference numerals identify like elements in the figures and in which:

DESCRIPTION OF THE PREFERRED EMBODIMENT

Figure 1:
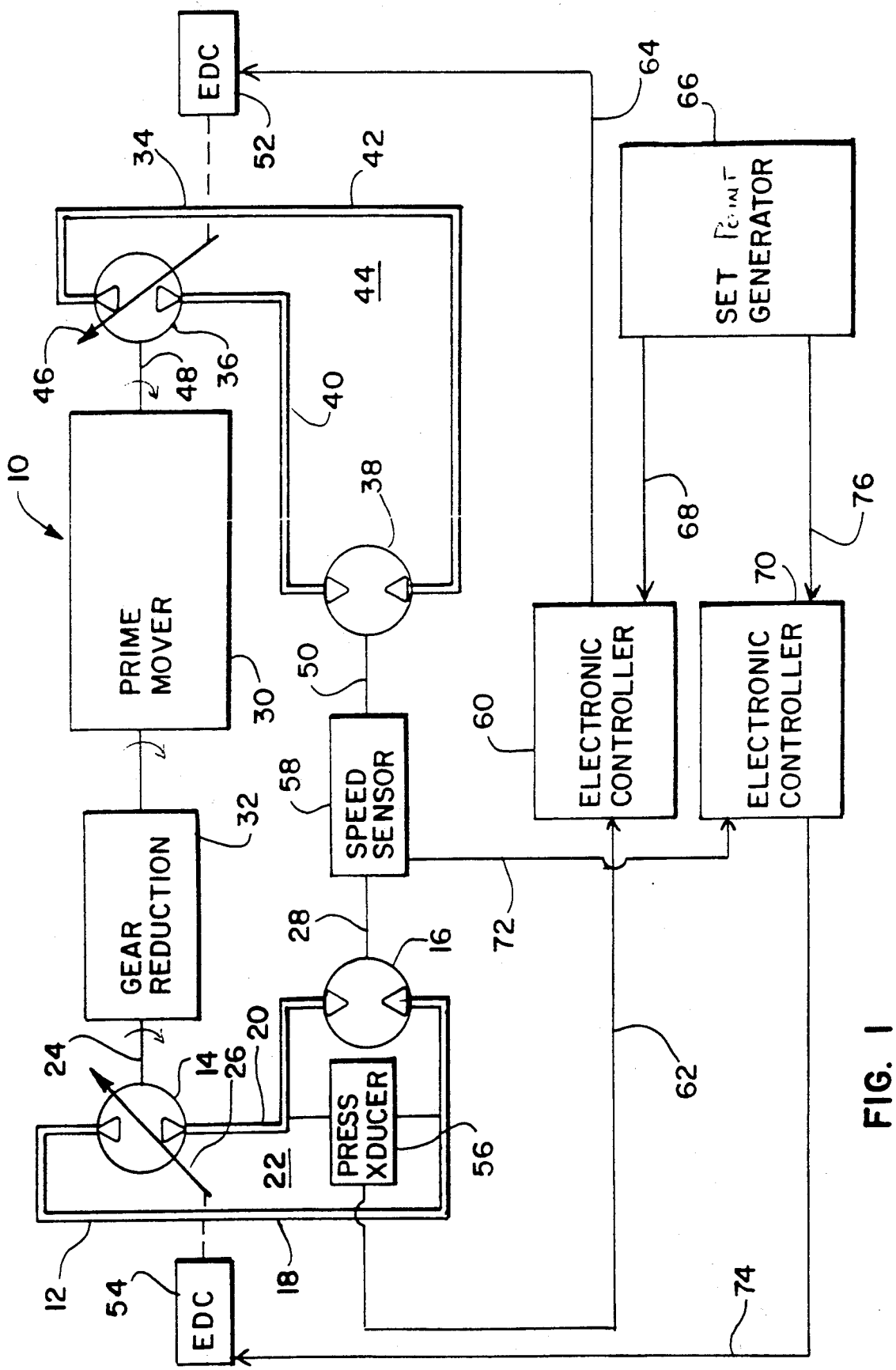
FIG. 1 is a block diagram of a hydrostatic test stand embodying the present invention.

A hydrostatic drive unit test stand, illustrated generally at 10, is set up as shown schematically in FIG. 1 for testing a test specimen 12 in the form of a hydrostatic drive unit which includes a variable displacement hydraulic pump 14 and a hydraulic motor 16 connected by a pair of fluid lines 18 and 20 to form a closed fluid circuit 22. Pump 14 has an input shaft 24 for driving the pump such that hydraulic fluid is directed around the circuit 22 to energize the motor and rotate motor output shaft 28. Pump 14 also includes a tiltable swashplate 26, which, by means known to those skilled in the art, is positionable for varying the magnitude and direction of rotation of motor shaft 28.

A prime mover in the form of an electric motor 30 is drivingly connected with pump input shaft 24 through a gear reduction or increaser 32. Activation of electric motor 30 results in the geared rotation of pump input shaft 24 which, in turn, generates a hydraulic flow in the circuit 22. As described, the flow passes through motor 16 such that output shaft 28 is, in turn, rotated. Gear reduction 32 may comprise a number of interengaged toothed gears of varying diameter or, alternatively, may comprise an additional hydrostatic system having a hydraulic pump and motor arranged in a fluid circuit. With this arrangement, it should be seen that activation of electric motor 30 is effective to produce a rotational output at motor shaft 28. The foregoing describes the manner in which test specimen 12 is driven at a single operating condition. The present invention is directed toward an apparatus for adaptively controlling the operation conditions at which the specimen is tested.

Specifically, test stand 10 includes a hydraulic load unit 34 having a variable displacement hydraulic pump 36 and a hydraulic motor 38 connected by a pair of fluid lines 40 and 42 to form a closed fluid circuit 44. Pump 36 has a tiltable swashplate 46 and a pump shaft 48 drivingly connected to electric motor 30. A motor shaft 50 is fixedly joined with motor output shaft 28 of hydraulic motor 16 such that motor shafts 28 and 50 are prohibited from independent rotation.

Test stand 10 includes a pair of control loops 51a and 51b not shown in FIG. 1 associated with tiltable swashplates 46 and 26, respectively, for prescribing the angular position thereof. Control loop 51a includes a pressure transducer 56 mounted within closed fluid circuit 22 which communicates with each of fluid lines 18 and 20 for determining the relative pressure difference or delta system pressure therebetween. A first proportional integral derivative (PID) controller 60 receives a pressure feedback signal from pressure transducer 56 by means of a signal line 62. PID controller 60 transmits a load control signal to an electronic displacment controller (EDC) 52 by means of a signal line 64. PID controller 60 communicates with a set point generator 66 by means of a signal line 68.

Control loop 51b includes a speed sensor 58 mounted on motor output shaft 28. A second PID controller 70 receives a speed feedback signal from speed sensor 58 by means of a signal line 72, and transmits a speed control signal to a second EDC 54 by means of signal line 74. PID controller 70 communicates with set point generator 66 by means of signal line 76.

Operation of the test stand will now be described. Initially each of tiltable swashplates 26 and 46 are configured in a neutral position such that activation of prime mover 30 results in rotation of pump shafts 24 and 48 without inducing any fluid flow in closed fluid circuits 22 and 44, respectively. Swashplate 26 of hydraulic pump 14 is then adjusted away from neutral with a speed set point change on the electronic controller by means of EDC 54 and provides fluid flow to hydraulic motor 16. Flow through motor 16 tends to rotate shaft 28. However, because of the fixed connection between motor shaft 28 and 50, shaft 28 is resisted from rotating by the inertia of the hydraulic load unit 34.

As pump 14 to direct flow toward motor 16, which is, in turn, resisted from rotating by the hydraulic load unit, hydraulic pressure in the drive unit 12 begins to rise. Specifically, fluid pressure in line 18 increases while pressure in fluid line 20 remains relatively small. This rise in relative pressure difference between fluid lines 18 and 20 is detected by pressure transducer 56.

The pressure differential is continually monitored by electronic controller 60 and compared with a desired pressure set point retained by set point generator 66. When the pressure differential exceeds the set point pressure, controller 60 transmits an appropriate load control signal to EDC 52, which, in turn, adjusts the position of swashplate 46 away from neutral. By adjusting swashplate 46, a fluid flow is established within closed fluid circuit 44. The flow passes through hydraulic motor 38 and induces rotation of motor shaft 50. The induced rotation reduces the resistance force acting against motor output shaft 28 and thereby reduces the pressure differential in drive unit 12. The modulated pressure differential within the drive unit is continually monitored and swashplate 46 is directed to move by EDC 52 until the pressure differential is reduced to the pressure set point.

Test stand 10 is further operable to maintain a speed set point for output shaft 28. Speed sensor 58 continually monitors the speed of shaft 28 and relays an appropriate feedback signal to electronic controller 70. The speed feedback signal is continuously compared with a speed set point retained within set point generator 66. When the measured speed either exceeds or falls below the speed set point, an appropriate speed control signal is transmitted by controller 70 along signal line 74 to EDC 54, which, in turn, modulates the position of swashplate 26. Swashplate 26 is continuously adjusted to maintain a commanded speed set point.

It is possible that in attaining the speed set point for hydraulic motor 16, the pressure differential within closed fluid circuit 22 may be effected. In this event, the modified pressure differential is detected by pressure transducer 56 and appropriate action is automatically taken, as described above, to maintain the desired pressure set point.

During operation of test stand 10, hydraulic load unit 34 may operate in an energy-absorbing mode of operation while applying rotational resistance to motor output shaft 28. In this mode, hydraulic motor 38 acts as a pump and pump 36 acts as a hydraulic motor. Forced rotation of shaft 50 directs fluid within circuit 44 toward motor/pump 36. Flow through motor/pump 36 results in rotation of shaft 48, which provides regenerated power back into the prime mover 30. This energy is then directly applied back to the shaft 24 of pump 14. This feature results in considerable savings and operating expense of prime mover 30. Power may be regenerated whenever motor output shaft 28 is commanded by means of flow in circuit 22 to rotate at a different rate than that which motor shaft 50 will permit, independent of the speed of motor shaft 28.

Test stand 10 provides a relatively low cost, electronically controlled apparatus for automatically monitoring and commanding the motor speed and system pressure for a hydraulic test specimen. Because of the flexible operation of the apparatus, it is particularly well suited to run more than one type of test on a given test stand, e.g. switch from performance testing to endurance testing, or assess uphill loading vs downhill loading, without moving to another test stand.

Set point generator 66, which may take the form of a conventional personal computer, is fully programmable and can also be used to record the actual system pressure and motor speed characteristics of a hydraulic drive unit installed on a vehicle drive train undergoing actual operation. The recorded data can then be played back through the set point generator within the test stand 10 and used to recreate the actual vehicle operating profile in a simulated laboratory environment.

The constant torque of an inertial load, such as a flywheel, can be conveniently simulated with the test stand. The effect of an inertial load on a drive train would be represented by small accelerations of the motor output shaft in the case of a large inertia and, alternatively, rapid acceleration rates of the motor output shaft for relatively small inertias. By using the test stand, the acceleration rate of motor output shaft 28 can be controlled by controlling the acceleration rate of motor shaft 50, which, in turn, is controlled by the angle of swashplate 46 in variable displacement pump 36. Thus, the apparent inertia affecting test specimen 12 is controlled by controlling the acceleration rate of hydraulic motor 38. It will be understood that the invention may be embodied in other specific forms without departing from the spirit or central characteristics thereof. The present examples and embodiments, therefore, are to be considered in all respects as illustrative and not restrictive, and the invention is not to be limited to the details given herein.

I claim:

1. A test stand for testing hydrostatic drive units which have a variable displacement hydraulic pump and a hydraulic motor interconnected by a pair of fluid lines to define a closed fluid circuit, the drive units being characterized by a motor output speed and a system fluid pressure, the test stand comprising:

a) a power source for energizing a hydrostatic drive unit;
   b) speed control means for controlling the level of motor output speed when the drive unit is energized by the power source;
   c) pressure control means for controlling the level of system fluid pressure when the drive unit is energized by the power source;
   d) sensing means for sensing an instantaneous level of motor output speed and system fluid pressure, the sensing means including a pressure transducer adapted to sense the relative difference in system fluid pressure between each of the pair of fluid lines in the closed fluid circuit; and
   e) supervisory control means for providing a first command signal responsive to the sensed instantaneous level of motor output speed to the speed control means and a second command signal responsive to the sensed instantaneous level of fluid system pressure to the pressure control means.

2. The test stand according to claim 1 in which the power source for energizing the hydraulic pump comprises an electric motor.

3. The test stand according to claim 1 in which the speed control means comprises an electronic displacment controller adapted to vary the displacement of the hydraulic pump.

4. The test stand according to claim 1 in which the pressure control means comprises an electronic displacement controller adapted to vary the magnitude of a resistance force on the hydraulic motor.

5. The test stand according to claim 4 in which the pressure control means includes hydraulic controls.

6. The test stand according to claim 1 in which the sensing means includes a speed sensor mounted adjacent an output shaft of the hydraulic motor.

7. The test stand according to claim 1 in which the supervisory control means comprises a PID controller for generating a command signal responsive to the sensed motor output speed and system fluid pressure levels and representative of a desired motor output speed and system fluid pressure.

8. A test stand for testing hydrostatic drive units having a variable displacement hydraulic pump in a closed fluid circuit with a hydraulic motor, the drive units being characterized by a motor output speed and a system fluid pressure, the test stand comprising:
   a) prime mover means for energizing a hydrostatic drive unit;
   b) speed modulating means for modulating the motor output speed;
   c) pressure modulating means including a hydrostatic load unit having a pair of hydraulic devices connected in a closed fluid circuit, the hydrostatic load unit being interconnected with the hydrostatic drive unit for modulating the system fluid pressure in the hydrostatic drive unit;
   d) sensing means for sensing the motor output speed and the system fluid pressure of the hydrostatic drive unit;
   e) first control means for generating a command signal responsive to the sensed motor output speed and sufficient to maintain the motor output speed at a predetermined level; and
   f) second control means for generating a command signal responsive to the sensed system fluid pressure and sufficient to maintain the system fluid pressure at a predetermined level.

9. The test stand according to clam 8 in which one of the hydraulic devices in the hydrostatic load unit is a hydraulic motor and has a first motor output shaft and the hydraulic motor of the hydrostatic drive unit has a second motor output shaft, and in which the first motor output shaft and the second motor output shaft are fixedly interconnected.

10. The test stand according to claim 8, in which one of the hydraulic devices in the hydrostatic load unit is a variable displacement hydraulic pump and has a first pump shaft and the variable displacement hydraulic pump of the hydrostatic drive unit has a second pump shaft, and in which the first pump shaft and the second pump shaft are drivingly connected with the prime mover.

11. The test stand according to claim 10 having gear reduction means interposed between the prime mover and the second pump shaft for varying the degree of energization of the hydrostatic drive unit.

12. The test stand according to claim 11 in which the gear reduction means comprises a hydrostatic unit having a variable displacement hydraulic pump in a closed fluid circuit with a hydraulic motor.

13. The test stand according to claim 8 in which the sensing means includes a pressure transducer adapted to sense the relative difference in system fluid pressure between each of a pair of fluid lines interconnecting the variable displacement pump and the hydraulic motor of the hydrostatic drive unit.

14. The test stand according to claim 13 having an electronic displacement controller for varying the displacement of a the variable displacement hydraulic pump in the hydrostatic load unit in response to the relative pressure sensed by the pressure transducer.

15. A test stand for testing hydrostatic drive units having a variable displacement hydraulic pump in a closed fluid circuit with a hydraulic motor at a predetermined operating profile of motor output speed and system fluid pressure, the test stand comprising:
   a) prime mover means for energizing a hydrostatic drive unit;
   b) speed modulating means for modulating the motor output speed;
   c) pressure modulating means including a hydrostatic load unit having a variable displacement hydraulic pump and a hydraulic motor connected in a closed fluid circuit, the hydrostatic load unit being interconnected with the hydrostatic drive unit for modulating the system fluid pressure;
   d) sensing means for sensing the motor output speed and system fluid pressure of the hydrostatic drive units;
   e) setpoint generating means for generating a command signal responsive to the sensed motor output speed and system fluid pressure and representative of a desired motor output speed and system fluid pressure;
   f) first control means for effecting the speed modulating means such that the motor output speed is maintained at a predetermined level, with electronic circuitry interconnecting the speed sensing means and speed modulating means and setpoint generating means for providing the command signal to the first control means; and
   g) second control means for effecting the pressure modulating means such that the system fluid pressure is maintained at a predetermined level, with electronic circuitry interconnecting the pressure sensing means and pressure modulating means and setpoint generating means for providing the command signal to the second control means.

16. The test stand according to claim 15 in which the control means for effecting the speed modulating means comprises a first PID controller disposed intermediate the sensing means and the setpoint generator and the speed modulating means.

17. The test stand according to claim 16 in which the control means for effecting the pressure modulating means comprises a second PID controller disposed intermediate the sensing means and the setpoint generator and the pressure modulating means.

18. The test stand according to claim 15 in which the setpoint generator comprises a data acquisition apparatus for recording the motor output speed levels and system fluid pressure levels of a hydrostatic drive unit in an actual operating profile.

19. The test stand according to claim 18 in which the setpoint generator comprises a command device for generating a command signal responsive to the sensed motor output speed and system fluid pressure and representative of a desired motor output speed and system fluid pressure as determined by corresponding levels in a recorded actual operating profile.

20. The test stand according to claim 15 in which the setpoint generating means is a personal computer.

21. The test stand according to claim 15 having means for transmitting energy absorbed by the hydraulic load unit to the prime mover means such that energy consumption of the primer mover means is reduced.

* * * * *